(12) United States Patent
Lakkis

(10) Patent No.: US 8,611,401 B2
(45) Date of Patent: Dec. 17, 2013

(54) CANCELLATION SYSTEM FOR MILLIMETER-WAVE RADAR

(75) Inventor: Ismail Lakkis, San Diego, CA (US)

(73) Assignee: Adeptence, LLC, San Diego, CA (US)

( * ) Notice: Subject to any disclaimer, the term of this patent is extended or adjusted under 35 U.S.C. 154(b) by 331 days.

(21) Appl. No.: 13/074,861

(22) Filed: Mar. 29, 2011

(65) Prior Publication Data

US 2011/0243202 A1 Oct. 6, 2011

Related U.S. Application Data

(60) Provisional application No. 61/319,989, filed on Apr. 1, 2010.

(51) Int. Cl.
*H04B 1/38* (2006.01)
(52) U.S. Cl.
USPC .......................... 375/219; 375/346; 375/351
(58) Field of Classification Search
USPC .......................................... 375/219, 346, 351
See application file for complete search history.

(56) References Cited

U.S. PATENT DOCUMENTS

| | | | |
|---|---|---|---|
| 8,175,535 B2* | 5/2012 | Mu | 455/67.11 |
| 2004/0151238 A1* | 8/2004 | Masenten | 375/219 |
| 2008/0232268 A1* | 9/2008 | Kahrizi et al. | 370/252 |
| 2009/0050685 A1* | 2/2009 | Frederick et al. | 235/375 |
| 2009/0086864 A1* | 4/2009 | Komninakis et al. | 375/346 |
| 2009/0232260 A1* | 9/2009 | Hayashi et al. | 375/346 |
| 2010/0285733 A1* | 11/2010 | Gore et al. | 455/7 |

* cited by examiner

*Primary Examiner* — Juan A Torres
(74) *Attorney, Agent, or Firm* — Steven J Shattil

(57) ABSTRACT

In a millimeter-wave radar, full-duplex operation comprises identifying a leakage signal in a digital baseband received signal, estimating the leakage signal, synthesizing an estimated leakage signal, and subtracting the estimated leakage signal from the digital baseband received signal. The time interval during which the leakage signal occurs may be measured, and samples of the digital baseband received signal within the time interval are masked to remove the leakage.

13 Claims, 5 Drawing Sheets

CANCELLATION SYSTEM FOR MILLIMETER-WAVE RADAR

CROSS-REFERENCE TO RELATED APPLICATIONS

This application claims priority under 35 U.S.C. 119(e) to U.S. Provisional Application Ser. No. 61/319,989, filed Apr. 1, 2010.

BACKGROUND OF THE INVENTION

I. Field of the Invention

Certain aspects of the present disclosure generally relate to duplexers used in radar systems for simultaneously transmitting and receiving signals, and more particularly, to a cancellation circuit to cancel leakage signals.

II. Description of the Related Art

In one aspect of the related art, a wireless transceiver system may be used for millimeter wave communications, such as the systems envisioned in the Institute of Electrical and Electronic Engineers (IEEE) 802.11.ad and IEEE 801.15.3c standards, and the Wireless Gigabit Alliance (WGA). The PHY layer may be configured for millimeter wave communications in the spectrum of 57 to 66 gigahertz (GHz), or Ultra Wide Band (UWB) communications in the spectrum of 3.1 to 10.6 GHz.

In another aspect of the related art, such transceiver systems may be used for radar applications. The transceiver emits a waveform comprising a single pulse, a sequence of pulses, or a continuous waveform having a finite duration. The waveform may be transmitted periodically at a predetermined interval. A transmitted signal is scattered by a target of interest, and a reflected signal returns to the transceiver, where it is amplified, down-converted, digitized, and then processed to obtain the target's parameters.

Nearby targets, referred to as clutter, typically do not include targets of interest. Backscatter from clutter produces strong echoes with very small delays. For example, a target at 3 m from the transceiver produces a reflected signal at 20 ns. If the transceiver shares a single antenna for both transmit and receive operations, a high-speed switch would need to be employed. However, such switches are costly and difficult to implement. Furthermore, full-duplex systems often suffer from insufficient isolation of the receiver from the transmitter, resulting in a substantial leakage signal.

SUMMARY OF THE INVENTION

Aspects of the disclosure solve these and other problems. The aspects disclosed herein may be advantageous to systems employing millimeter-wave wireless personal area networks (WPANs). However, the disclosure is not intended to be limited to such systems, as other applications may benefit from similar advantages.

According to an aspect of the disclosure, a received signal in a full-duplex transceiver is down-converted and digitized before interference cancellation is performed. The leakage signal component in a digital baseband received signal is identified and estimated. The leakage signal may comprise a combination of direct leakage from the transmitter to the receiver and scattered signals from clutter. An estimated digital baseband leakage signal is synthesized and then subtracted from the digital baseband received signal. Identification and estimation of the leakage signal may be performed during a calibration phase. Following the calibration phase, signal cancellation is performed during a normal operating phase.

According to another aspect of the disclosure, the time interval between transmitting a signal and detecting a resulting leakage signal is measured. A detector generates samples of the digital baseband received signal, which comprises at least a leakage signal, and possibly at least one desired signal. A canceller masks a subset of the samples corresponding to the measured time interval in order to remove the leakage component of the digital baseband received signal. In one aspect of the disclosure, the time interval is measured during a calibration phase, and sampling and masking are performed during a normal operating phase.

BRIEF DESCRIPTION OF THE DRAWINGS

Aspects of the invention are illustrated in the figures of the accompanying drawings, which are meant to be exemplary and not limiting, in which like references are intended to refer to like or corresponding parts, and wherein.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the claimed invention. Instead, they are merely examples of systems and methods consistent with aspects related to the invention as recited in the appended claims.

Figure 1:
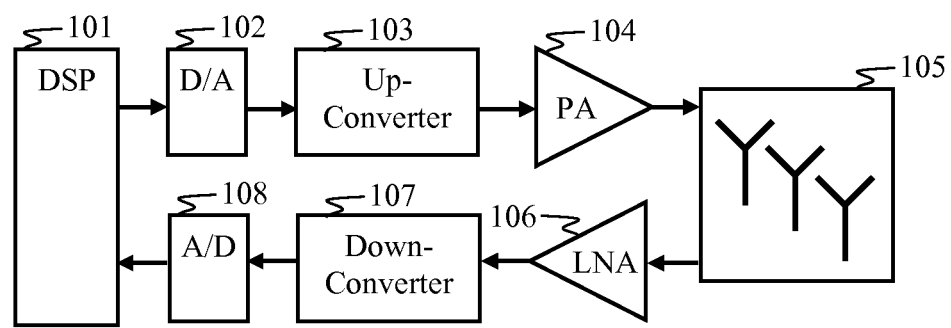
FIG. 1 is a block diagram of a millimeter-wave radar system that may employ aspects of the invention.

FIG. 1 is a simplified block diagram of a millimeter-wave radar system that may employ aspects of the invention. The millimeter-wave radar system may be configured to operate in the 60 GHz band. A digital signal processor 101 is configured to perform baseband processing for transmit and receive operations. A transmit branch comprises a digital-to-analog converter (D/A) 102, an up-converter 103, and a power amplifier (PA) 104. The digital-to-analog converter 102 converts an output digital transmit signal into an analog signal, which is up-converted by the up-converter 103 to an analog millimeter-wave signal. The millimeter-wave signal may optionally be amplified by the power amplifier 104 before it is transmitted by an antenna system 105.

The antenna system 105 comprises one or more antennas configured to transmit and receive millimeter-wave signals. A receive branch comprises a low-noise amplifier (LNA) 106, a down-converter 107, and an analog-to-digital converter (A/D) 108. Received millimeter-wave signals are amplified by a low-noise amplifier 106, converted to baseband by the down-converter 107, and digitized by an analog-to-digital converter 108 before being processed by the digital signal processor 101.

While FIG. 1 is representative of a typical millimeter-wave transceiver, aspects of the invention may be applied to alternative transceiver configurations. Various signal-processing blocks that are well-known to those skilled in the art are not shown. In some aspects of the invention, pulse-shaping filters (not shown) may be employed. Some aspects of the invention may provide for generating and processing intermediate-frequency (IF) signals.

The millimeter-wave transceiver shown in FIG. 1 may be configured to function as a short-range radar system. For low-power operation, aspects of the invention may provide for omitting the power amplifier 104 from the transceiver design. The antenna system 105 may comprise power couplers, circulators, or any other isolation system that are not shown. Separate transmit and receive antennas may be provided for concurrent operation. However, in all of these cases, it is common for leakage to occur between the transmit and receive branches.

According to one aspect of the invention, the transmit and receive branches of the transceiver operate at the same time such that the receive branch receives direct leakage of the transmitted signal produced by the transmit branch. Other aspects of the invention may further provide for isolation between the transmitter and receiver, thus reducing the leakage. The signal received by the receive branch is a composite signal comprising scattered signals from one or more desired targets, any scattering from other objects in the environment (i.e., channel effects), and the leakage signal. Thus, desired information (i.e., echoes from the one or more desired targets) is contaminated by the leakage signal. Aspects of the invention provide for measuring the leakage signal and performing baseband interference cancellation for canceling the leakage signal from the composite signal. In some aspects of the invention, masking is performed for removing the leakage signal from the composite signal.

Figure 2A:
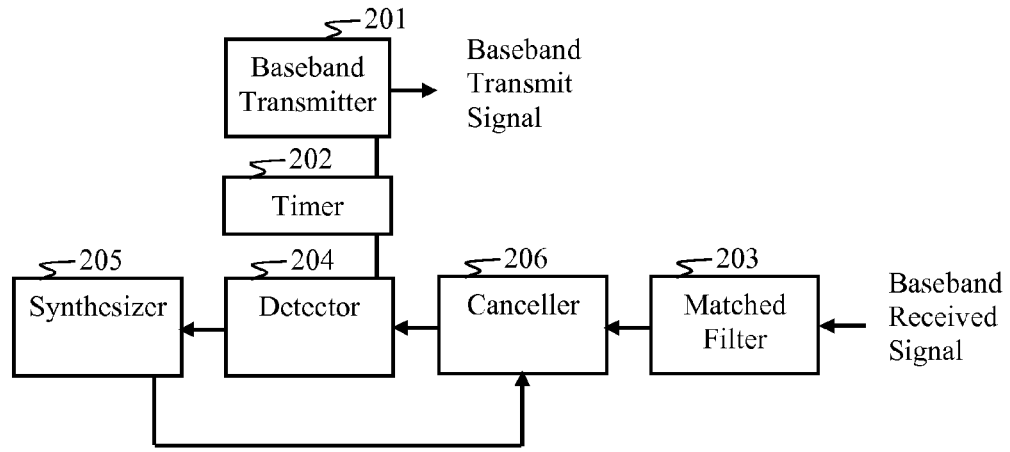
FIG. 2A is a block diagram of a baseband processor for processing leakage signals in a digital baseband received signal in accordance with an aspect of the invention.

FIG. 2A is a block diagram of a baseband processor for processing leakage signals in a digital baseband received signal in accordance with an aspect of the invention. A baseband transmitter 201 generates a digital baseband signal for upconversion and transmission by an antenna system (not shown). A baseband receiver comprises an optional matched filter 203, a detector 204, an interference synthesizer 205, and a canceller 206 for processing a received down-converted and digitized signal. A timer 202 is configured for interacting with both the transmit and receive sides of the baseband processor.

In some aspects of the invention, the matched filter 203 may be omitted, such as if the transmitted signal is pulse-based. In other aspects of the invention, if the signal is continuous, the matched filter 203 is typically employed. For example, if the transmitter 201 generates a transmit signal comprising a preamble encoded with Golay codes, then the matched filter 203 employed by the baseband receiver may be a Golay matched filter.

According to a functional aspect of the invention, the baseband processor shown in FIG. 2A comprises at least some components of the digital signal processor 101 shown in FIG. 1. The baseband transmitter 201 generates a baseband transmission signal, such as a pulse, a train of pulses, or a continuous-wave signal. When the baseband transmit signal is transmitted, the timer 202 is initiated. Received baseband signals are processed by the detector 204. For example, level detection may be employed for detecting signals above a predetermined threshold value. Once a signal is detected, the timer 202 may be switched off, and the resulting time value is stored, such as in the synthesizer 205. The synthesizer 205 employs information about the received signal obtained by the detector 204 (such as timing information, amplitude, polarization, and/or phase) to synthesize a leakage signal. In some aspects of the invention, the synthesizer 205 may be coupled to the baseband transmitter 201 for obtaining the baseband transmit signal.

In one aspect of the invention, a digital baseband received signal is input to the canceller 206 and the synthesized leakage signal is subtracted therefrom to produce an interference-cancelled signal. The synthesized leakage signal is calculated during a calibration phase. Upon completion of the calibration phase, the transceiver commences a normal operating phase during which the synthesized leakage signal is subtracted from the digital baseband received signal. During the normal operating phase, the digital baseband received signal comprises a leakage signal and typically at least one desired signal, such as a signal reflection from a target of interest. In another aspect of the invention, the canceller 206 may follow the detector 204. The synthesized leakage signal is then combined with the detector 204 output in the canceller 206 for canceling the leakage portion of the digital baseband received signal.

Figure 2B:
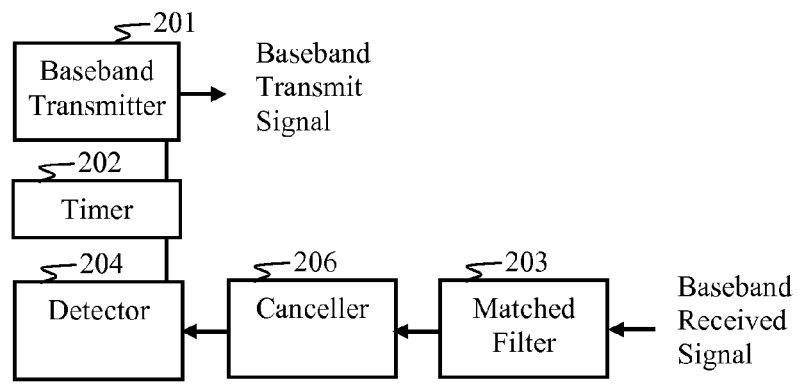
FIG. 2B is a block diagram of a baseband processor illustrating another aspect of the invention.

In one aspect of the invention, a transceiver shown in FIG. 2B comprises a baseband transmitter 201, a timer 202, a matched filter 203, a detector 204, and a canceller 206. During a calibration phase, the timer 202 measures the time interval between when a baseband transmission signal is transmitted and when a leakage signal from the transmission is detected by the detector 204. This time interval is typically much smaller than the time delays for signal reflections received from targets of interest. Therefore, the canceller 206 may enhance the receiver's signal-to-noise by masking samples of the digital baseband received signal during the time interval. In this case, the canceller 206 masks the samples by zeroing, discarding, or otherwise removing those samples. In some aspects of the invention, the canceller 206 may follow the detector 204 and be configured to mask samples output by the detector 204.

It should be understood that various aspects of the invention may be implemented in hardware, firmware, software, or combinations thereof. In such aspects, any of the components 201-206 may be implemented in hardware, firmware, and/or software to perform the functions of the present invention. When implemented in software, firmware, middleware or microcode, the program code or code segments to perform the necessary tasks are stored in a non-transient machine-readable medium, such as a storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Figure 3:
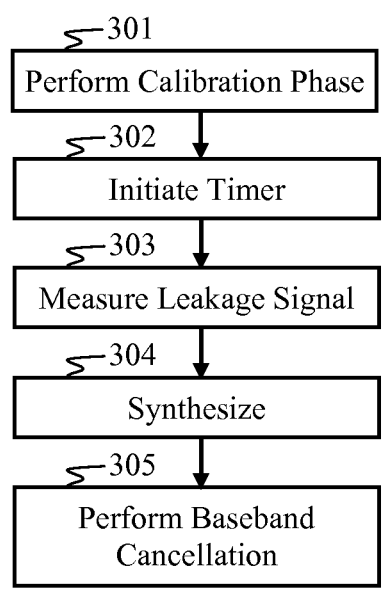
FIG. 3 is a flow diagram depicting a method for canceling interference in a millimeter-wave radar system in accordance with an aspect of the invention.
Figure 4:
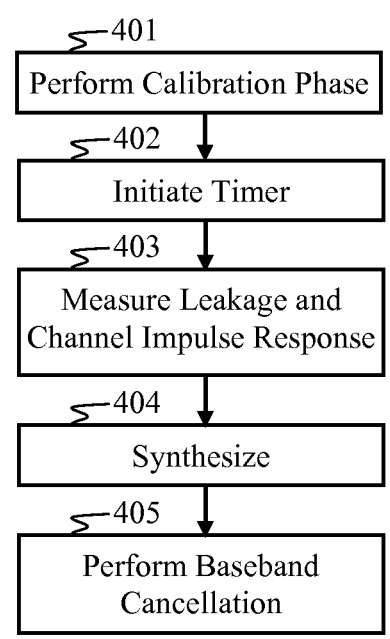
FIG. 4 is a flow diagram depicting a method for canceling interference in a millimeter-wave radar system in accordance with an alternative aspect of the invention.
Figure 5:
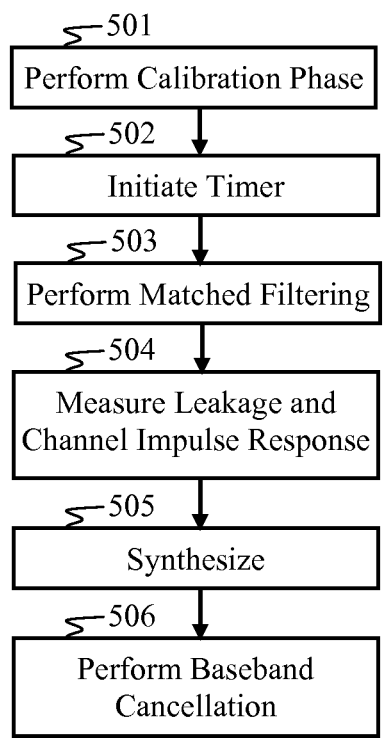
FIG. 5 is a flow diagram depicting a method of canceling interference in a millimeter-wave radar system in accordance with another aspect of the invention.

FIGS. 3, 4, and 5 are flow diagrams depicting methods that are performed in accordance with some aspects of the invention. In such aspects, any of the steps shown in FIGS. 3, 4, and 5 may be implemented in hardware, firmware, and/or software to perform the functions of the present invention.

FIG. 3 is a flow diagram depicting a method for canceling interference in a millimeter-wave radar system in accordance with an aspect of the invention. A first step 301 comprises conducting a calibration phase wherein a test environment is prepared such that a receiver is responsive only to leakage signals produced by a transmitter. Thus, setting up the test environment 301 may comprise suppressing signals that are considered "desired signals" during the transceiver's normal operating mode. Suppressing signals, as used herein, means attenuating, removing or negating signals produced by the transmitter that are not the result of leakage. For example, in one aspect of the invention, the calibration phase 301 comprises transmitting signals into an environment that produces little or no scattering.

A timer initialization step 302 comprises starting a timer when the baseband transmit circuit transmits a signal. A measurement step 303 comprises detecting the leakage signal at the baseband receiver, and calculating the time offset of the leakage signal. If the transmitted signal comprises a single pulse, then the received baseband signal may be digitized by an analog-to-digital converter and a threshold detector is used to detect the presence of the leakage.

The time offset is the time interval between when the baseband transmit signal is generated and when the leakage signal is detected at the baseband receiver. Detecting the leakage signal may further comprise measuring other signal parameters of the leakage signal, such as signal amplitude, polarization, and/or phase.

A cancellation signal is synthesized 304 from the measurements of the leakage signal. The cancellation signal may be processed directly from a signal generated by the baseband transmitter, or the cancellation signal may be generated by the baseband receiver. The cancellation signal may be stored in a computer-readable memory.

Synthesis of the cancellation signal typically concludes the test-environment phase of the transceiver's operation. The transceiver may be returned to a normal operating phase, and the cancellation signal is combined with received baseband signals to remove the leakage component from the received baseband signals (i.e., perform baseband cancellation 305).

FIG. 4 is a flow diagram depicting a method for canceling interference in a millimeter-wave radar system in accordance with an alternative aspect of the invention. In a first step 401, a calibration phase comprises providing for a test environment in which a receiver is configured to be responsive to leakage signals produced by a transmitter, which may include a predetermined set of reflected signals in a scattering environment. Thus, the calibration phase 401 may comprise removing any targets of interest from the propagation environment, or negating the receiver's response to any targets of interest.

A timer initialization step 402 comprises starting a timer when the baseband transmit circuit transmits a signal. A measurement step 403 comprises detecting the leakage signal and any channel impulse response at the baseband receiver. Time offsets for the leakage signal and any reflected signals are measured. Other signal parameters, such as signal amplitude, polarization, and/or phase may be measured 403.

A cancellation signal is synthesized 404 from the measurements of the leakage signal and the channel impulse response. The cancellation signal may be processed directly from the signal generated by the baseband transmitter, or the cancellation signal may be generated locally by the baseband receiver. The cancellation signal may be stored in a computer-readable memory.

Synthesis of the cancellation signal typically concludes the test-environment phase of the transceiver's operation. The transceiver may be returned to a normal operating phase, and the cancellation signal is combined with the received baseband signals to remove the leakage component and any scattering components due to the channel (i.e., perform baseband cancellation 405).

In some aspects of the invention, the baseband transmitter may generate a transmit signal having a longer duration than the time offset of the leakage signal. For example, the transmitted signal may comprise a coded pulse train or a continuous waveform. In such cases, matched filtering may be performed on the received signal.

FIG. 5 is a flow diagram depicting a method of canceling interference in a millimeter-wave radar system in accordance with another aspect of the invention. In a first step 501, a calibration phase comprises configuring a receiver to be responsive to leakage signals and/or a predetermined set of reflected signals in a scattering environment.

A timer initialization step 502 comprises starting a timer when the baseband transmit circuit transmits a signal. Matched filtering 503 is performed on the received digital baseband signal. Time offsets for the leakage signal and any reflected signals are measured 504. Other signal parameters, such as signal amplitude, polarization, and/or phase may be measured. A cancellation signal is synthesized 505 from the measurements of the leakage signal and any channel impulse response.

Once the cancellation signal is synthesized 505, the test phase is concluded, and the transceiver may be returned to a normal operating mode in which targets of interest may be present in the environment. Baseband cancellation 506 comprises employing timing information of the received baseband signal to cancel leakage signals and any channel reflections.

According to another aspect of the invention, the methods described with respect to FIGS. 3, 4, and 5 may be performed for different transmit and receive polarizations.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant arts.

The invention claimed is:

1. In a transceiver, a method comprising:
   receiving a signal substantially free of a desired received signal for identifying a leakage signal in a digital baseband received signal;
   estimating the leakage signal;
   synthesizing an estimated digital baseband leakage signal; and
   subtracting the estimated digital baseband leakage signal from the digital baseband received signal for producing an interference-cancelled digital baseband received signal.

2. The method recited in claim 1, wherein estimating the leakage signal comprises measuring the digital baseband received signal during a calibration phase when desired signals are suppressed.

3. The method recited in claim 1, wherein estimating the leakage signal comprises measuring a time interval between transmitting a transmission signal and detecting the leakage signal.

4. The method recited in claim 1, wherein synthesizing comprises measuring a digital baseband transmit signal generated by the transceiver.

5. The method recited in claim 1, wherein the digital baseband received signal is a matched-filtered signal.

6. The method recited in claim 2, wherein identifying and estimating are terminated upon concluding the calibration phase.

7. A transceiver, comprising:
   a timer for measuring a time interval between transmitting a transmission signal and detecting a leakage signal in a digital baseband received signal that is substantially free of any desired received signal;
   a detector for estimating the leakage signal;
   a synthesizer for synthesizing an estimated digital baseband leakage signal; and
   a canceller for subtracting the estimated digital baseband leakage signal from the digital baseband received signal for producing an interference-cancelled digital baseband received signal.

8. The transceiver recited in claim 7, wherein the detector is configured for estimating the leakage signal during a calibration phase when desired signals are suppressed in the digital baseband received signal.

9. The transceiver recited in claim 7, wherein the time interval is employed for differentiating a leakage signal from a desired signal in the digital baseband received signal.

10. The transceiver recited in claim 7, wherein the estimated digital baseband leakage signal comprises at least one of the transmitted signal and a local signal generated by the synthesizer.

11. The transceiver recited in claim 7, wherein the detector comprises a threshold detector.

12. The transceiver recited in claim 7, wherein the digital baseband received signal is a matched-filtered signal.

13. A non-transitory machine-readable medium comprising instructions encoded thereon and executable to:
   identify a leakage signal in a digital baseband received signal;
   estimate the leakage signal;
   synthesize an estimated digital baseband leakage signal; and
   subtract the estimated digital baseband leakage signal from the digital baseband received signal to produce an interference-cancelled digital baseband received signal.

\* \* \* \* \*